Sept. 12, 1961 H. PANKUCH 2,999,329
SOUND EMITTING FISHING LURE
Filed Nov. 26, 1958

INVENTOR.
Henry Pankuch
By Smyth, Roston & Pavitt
Attorneys.

United States Patent Office

2,999,329
Patented Sept. 12, 1961

2,999,329
SOUND EMITTING FISHING LURE
Henry Pankuch, 1508 W. 101 St., Los Angeles 47, Calif.
Filed Nov. 26, 1958, Ser. No. 776,648
2 Claims. (Cl. 43—26.2)

This invention relates to fishing apparatus and more particularly to a sound emitting fishing lure.

It is an object of the present invention to provide a particularly effective lure containing an audible signal that will attract the fish thereto.

Another object of the present invention is to provide a fishing lure of the above type in which the audible device is actuated by a pair of water wheels as the lure is moved through the water.

Other objects of the invention are to provide a fishing lure which is of simple construction, has a minimum number of parts, is inexpensive to manufacture and is efficient in operation.

For other objects and for a better understanding of the invention, reference may be had to the following detailed description taken in conjunction with the accompanying drawing, in which.

Figure 1:
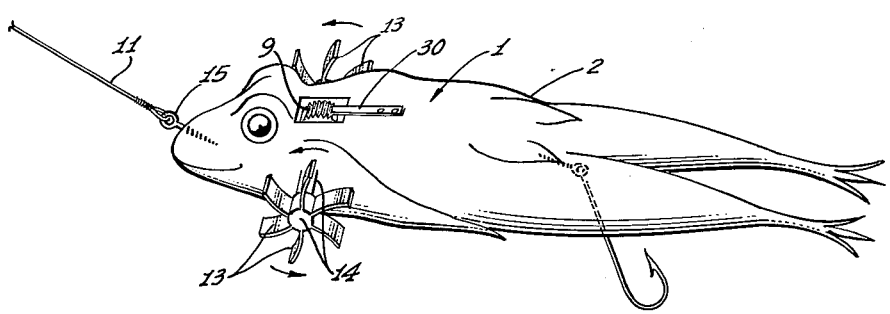
FIGURE 1 is a side elevational view of a fishing lure made in accordance with the present invention in operative use.
Figure 2:
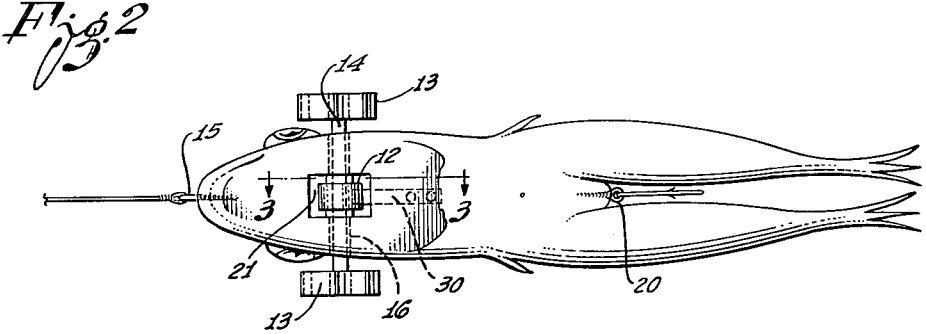
FIGURE 2 is a top plan view of a fishing lure shown in FIGURE 1.
Figure 3:
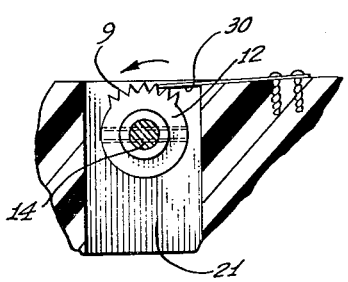
FIGURE 3 is an enlarged fragmentary cross sectional view of certain parts of the present invention.

Referring to FIGURES 1 through 3 of the drawing, a fishing lure 2 made in accordance with the present invention is shown.

The lure 2 includes a main body member 1 having a central cavity 21 which is a rectangular shaped vertical passageway through the lure 2. A shaft 14 extends across the cavity 21 and is rotatably supported within recesses 16 extending horizontally across the lure 2 and intersecting the cavity 21.

A ratchet wheel 12 is secured to the rotatable shaft 14 at the upper end of the cavity 21. A plurality of arcuate vanes 13 extend on each side of the lure 2 and serve as a pressure responsive means for effecting rotation of the shaft 14 and ratchet wheel 12 as the main body member 1 is drawn through the water. A reed 30 is secured at one end of the main body 1 and has its opposite end extending into the cavity 21 for frictional engagement with the teeth 9 of the ratchet wheel 12.

It will thus be recognized that as the fishing lure 1 is drawn through the water, the vanes 13 effect rotation of the shaft 14 and the ratchet wheel 12 so that an audible signal is emitted in the form of vibrations that travel through the water to attract fish thereto. To best simulate vibrations of various live insects, rodents, aquatic animals and other natural live foods of fish, the vibrations are not continuously provided. The ratchet wheel 12 as shown in FIGURE 3 tends to simulate the intermittent croak of a live frog by having a plurality of teeth 9 located on only one portion thereof. It is thus seen that as the reed 30 rides over the ratchet wheel 12 sound vibrations are provided which are similar to those provided by a live frog. Suitable spacing of teeth on the ratchet wheel 12 could thus produce sounds of grasshoppers, mice, crickets, etc. A pair of eyelets 15 and 20 at the rear and front ends of the main body member 1 provide fastening means for attaching fishing hooks, not shown, or a fishing hook and a fishing line 11 thereto.

The main body member 1 is partly hollow to provide proper buoyancy and to permit vanes 13 to operate in a most efficient manner by permitting only the lower vanes 13 to be in the water at any time.

To make the main body 1 of the lure appear natural appropriate coloring may be utilized. The invention hereto described is not limited to any one particular type or shape of lure but may be modified to simulate any insect, rodent, aquatic animal, etc., that is food for fish.

While various changes may be made in the detail construction, it shall be understood that such changes may be within the spirit and scope of the present invention as defined by the appended claims.

I claim:

1. An audible fishing lure, including, a buoyant body for maintaining the fishing lure horizontally aligned and partially submerged along the surface of the water having an upper and lower surface and defining a vertical opening from its upper surface through to its lower surface, said vertical opening being partially filled with water when the body is partially submerged, a horizontally aligned rotatable shaft supported by said body and passing transversely through said vertical opening of said body, a plurality of angularly spaced water vanes supported on each end of said rotatable shaft adjacent opposite sides of said body for rotating said shaft when the fishing lure is pulled along the surface of the water, only some of said vanes at each of the opposite sides of said body being in said water for any angular position of said rotatable shaft when the body is partially submerged, a ratchet wheel positioned in said vertical opening and supported on said rotatable shaft so as to be rotatable therewith, said ratchet wheel having a plurality of teeth along only a predetermined portion of the circumference of said ratchet wheel so as to provide for spaced audible signals, and a flexible reed having a first end supported on the upper surface of said body, and a second end contacting the circumference of said ratchet wheel to provide for an audible signal reverberating in the non-water filled portion of the vertical opening when the second end of the flexible reed is vibrated by the successive teeth of said ratchet wheel as the wheel is rotated with said shaft.

2. An audible fishing lure for simulating the sounds produced by a particular small animal attractive to fish when pulled through the water on a fish line, including, a body member having a shape simulating the appearance of the particular small animal and defining an opening through the body member in a direction transverse to the direction of movement of the fishing lure through the water on the fish line, means supported at the forward end of said body to which a fish line may be connected, means supported at the rear end of said body to which a hook may be connected, a rotatable shaft having a longitudinal axis which is perpendicular both to transverse direction of said opening and to the direction of movement of the fishing lure through the water, said shaft being rotatably supported by said body and passing completely through said body from one side of said body to the other and through said opening in said body, a ratchet wheel supported on said shaft in said opening of said body having a number of teeth along only a portion of the circumference thereof spaced to provide a predetermined intermittent sound simulating the sound produced by the particular small animal, a vibratile reed supported by said body and resiliently engaging the circumference of said ratchet wheel for providing the intermittent sound reverberating in the opening through the body member upon rotation of said ratchet wheel, and means supported at both ends of said shaft at opposite sides of said body and responsive to the pressure of the water as the fishing lure is pulled through the water by the fish line for rotating said shaft and said ratchet wheel therewith.

(References on following page)

References Cited in the file of this patent

UNITED STATES PATENTS

| | | |
|---|---|---|
| 2,230,919 | Wick | Feb. 4, 1941 |
| 2,232,102 | Dudek | Feb. 18, 1941 |
| 2,234,837 | Allen | Mar. 11, 1941 |
| 2,450,253 | Parnell | Sept. 28, 1948 |
| 2,485,053 | Layfield | Oct. 18, 1949 |
| 2,833,078 | Peltz | May 6, 1958 |
| 2,853,826 | Romeo | Sept. 30, 1958 |